Feb. 20, 1962 G. L. IRELAND 3,022,386

AUXILIARY TELEPHONE CRADLE

Filed May 31, 1960 2 Sheets-Sheet 1

INVENTOR.
GEORGE LEWIS IRELAND
BY
Lee D. Larrabee
his ATTORNEY

INVENTOR.
GEORGE LEWIS IRELAND
BY
[signature]
his ATTORNEY.

1

3,022,386

AUXILIARY TELEPHONE CRADLE

George Lewis Ireland, 1205 18th St., Manhattan Beach, Calif.

Filed May 31, 1960, Ser. No. 32,824
7 Claims. (Cl. 179—146)

My invention relates to an improved attachment for the stand of "hand set" telephones, the attachment being of the type designed to afford an auxiliary cradle for the usual receiver-transmitter of the set and which enables the user to put down the receiver in a convenient place and position relative to the telephone instrument, during use of the telephone and without interrupting the telephone circuit, thus leaving the user free to call another person to the phone, or to use both hands to search through a file, find a file or letter, etc., that he requires to make reference to in connection with his telephone conversation.

It it frequently awkward to find a place or spot on or adjacent to a crowded desk on which to lay down the receiver under the circumstances heretofore outlined, and various devices have heretofore been proposed to provide an auxiliary cradle attachment for the telephone receiver; some for instance, have been mounted on the base of the hand set and held thereon by parts engaging in a recess at the rear and under the top of the base and which recess is open to the back and provides access for a person's fingers when lifting the base.

The precise configuration of such recesses may vary in different telephone models, as may be readily verified by inspection, and I do not rely on the engagement of parts of my attachment with the walls of said recesses to support an auxiliary cradle for a telephone receiver-transmitter.

An object of my invention is to provide a novel auxiliary cradle for the base or stand of a hand set telephone and which cradle is securely held on the base by novel base engaging means.

Another object of my invention is to provide a novel auxiliary cradle for the base of a hand set telephone and which is so arranged as to leave the lifting recess in the upper portion of the base unobstructed; and which will facilitate the placing of the receiver-transmitter into, and its removal out of, the auxiliary cradle.

A further object of my invention is to provide a novel auxiliary cradle of the kind described which is of one-piece construction, and which is simple and inexpensive to manufacture, and which may be easily and quickly and securely attached to, and removed from, the base of a hand telephone set.

Other objects, advantages, and features of invention may appear from the accompanying drawings, the subjoined detail description, and the appended claims.

The accompanying drawings illustrate the invention in a form I at present deem preferable.

2

Figure 1:
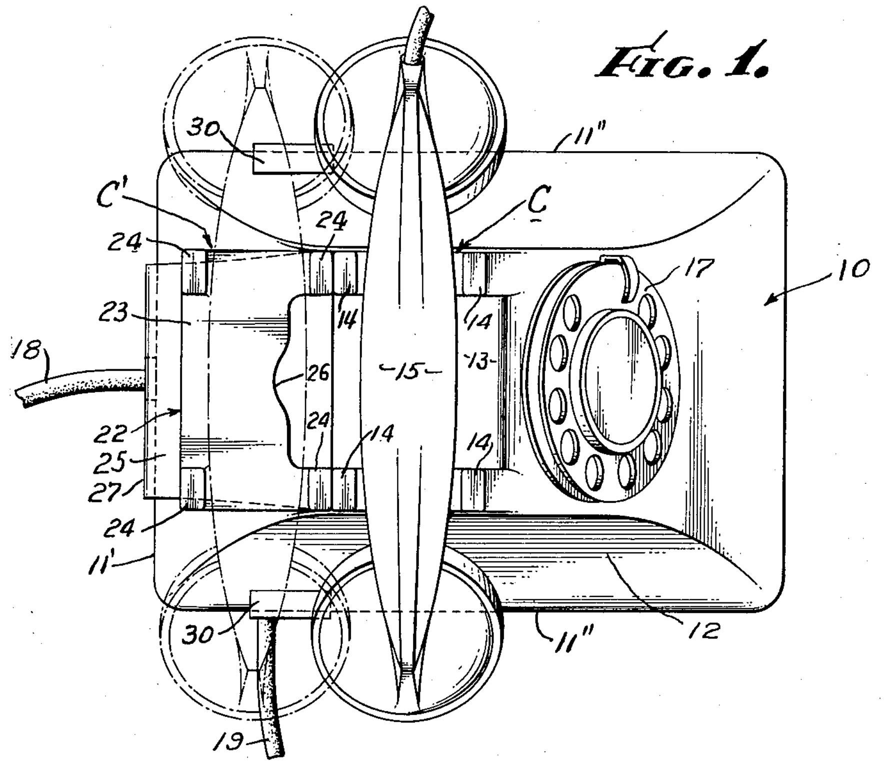
FIGURE 1 is a top plan view of a hand set telephone with the receiver-transmitter resting in its cradle and with an auxiliary cradle of my invention mounted on the base or stand, the position of the receiver-transmitter in the auxiliary cradle being indicated in dot and dash lines.
Figure 2:
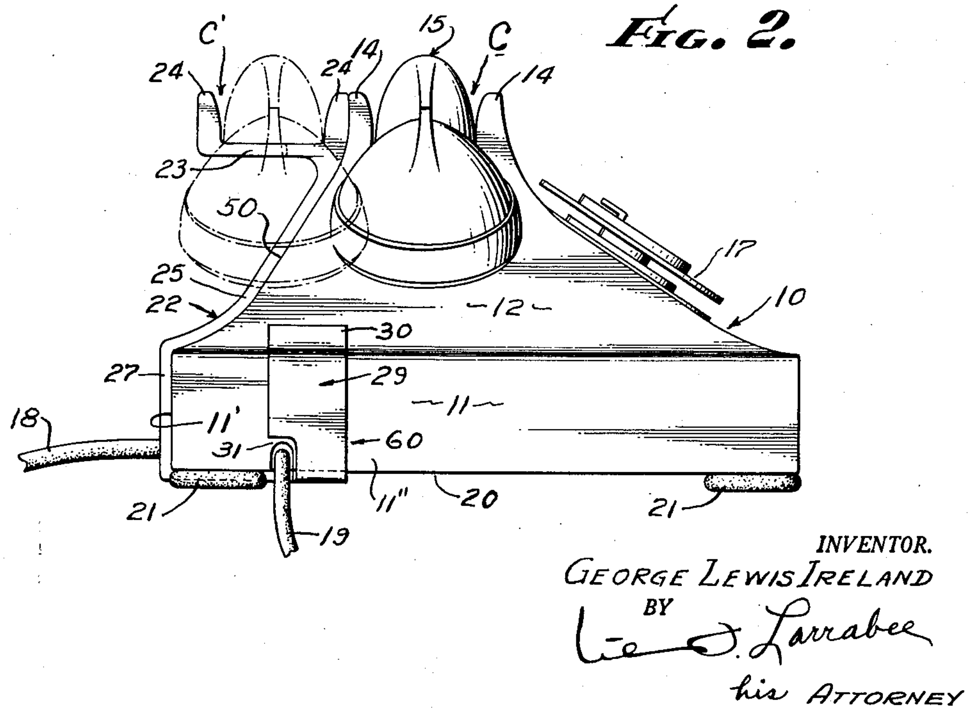
FIG. 2 is a side elevation of the parts shown in FIG. 1.
Figures 3, 4, 5, 6:
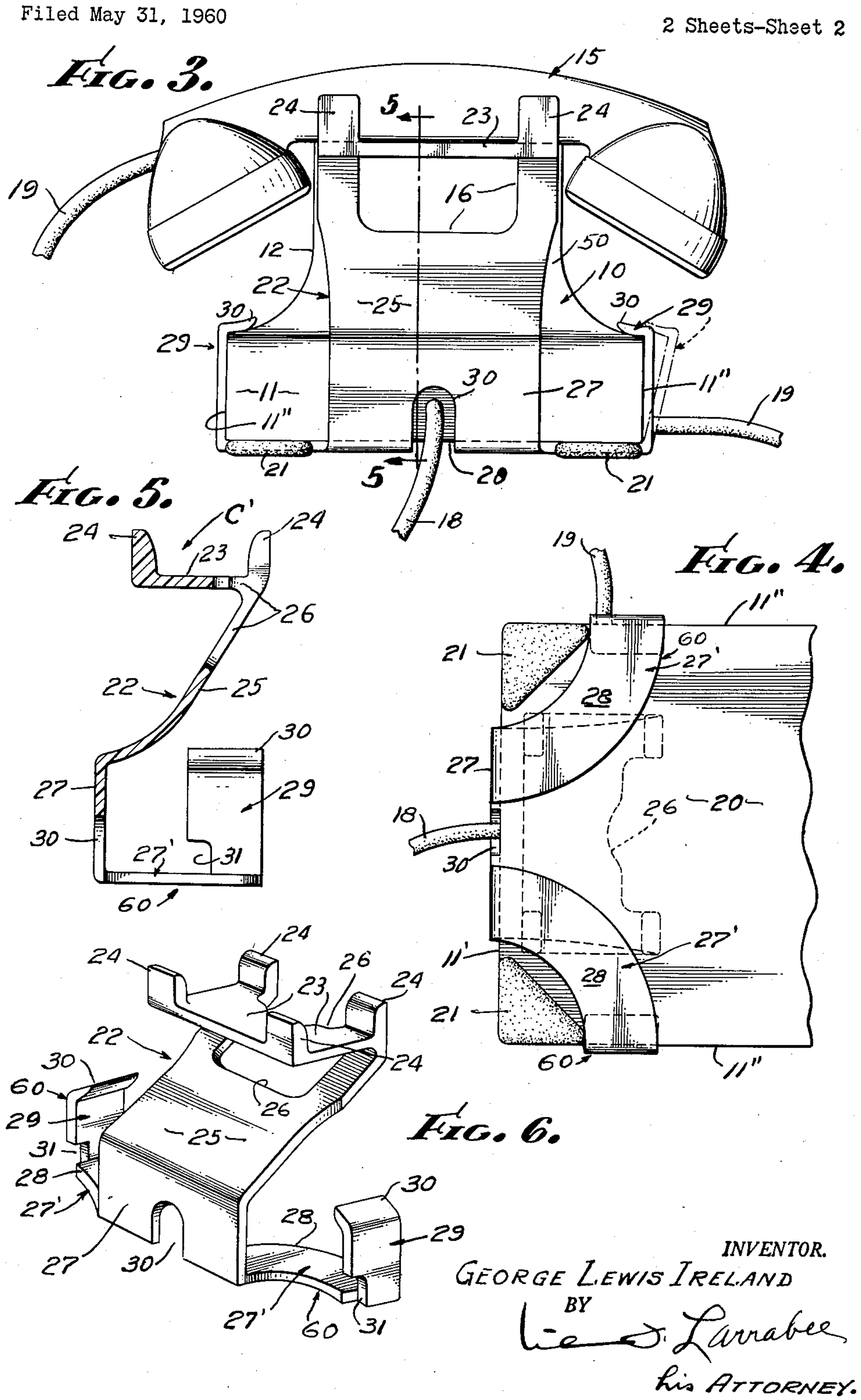
FIG. 3 is a rear elevational view of the back of FIG. 1. Dot and dash lines illustrate a retaining clip moved away from the base member.
FIG. 4 is a bottom view of a telephone hand set base having an auxiliary cradle of my invention associated therewith. Parts are broken away to contract the view.
FIG. 5 is a section on line 5—5, FIG. 3, of the auxiliary cradle member demounted from the base.
FIG. 6 is a perspective view of an auxiliary cradle member per se, drawn on a smaller scale.

Referring now to FIGS. 1, 2 and 3, a standard form of hand-set dial telephone is indicated at 10. The telephone comprises a vertical base or stand 11, a case 12 of roughly pyramid shape, the top surface 13 having upstanding lugs 14 at its corners formed by carrying up the sides of the case at the corners above the level of the top 13, to form a cradle C in which the receiver-transmitter 15 rests, when not in use, on spring pressed pins (not shown) effective to interrupt the circuit of the telephone when depressed by the weight of the receiver, as is customary in the type of hand telephone shown. A finger tip recess 16 is provided under the top surface 13 open at the back to facilitate lifting and carrying the hand set telephone.

A rotary dial 17 is mounted on the front wall of the case. The incoming telephone cable 18 is led into the back of the base, and the receiver cord 19 extending from the interior of the case is connected to the receiver-transmitter 15.

The bottom 20 of the case is flat and at each corner is provided with a triangular pad 21 of suitable material to prevent scuffing of the polished surface on which the hand set ordinarily rests.

The auxiliary cradle 22 of my invention comprises a top horizontal portion 23, preferably lying in a horizontal plane substantially the same as that of the top surface 13 of the hand set, and is provided at each corner thereof with upstanding lugs 24, analogous to lugs 14. The top portion 23 and lugs 24 provide an auxiliary cradle C'.

A depending plate 25 integral with the top surface 23 is angled downwardly to fit snugly against the back side 50 of the hand set case 12 and a finger cut-out 26 is provided in the horizontal top surface portion 23 toward the top of the hand set case 12 and such cut-out 26 is carried downwardly in the top of plate 25 to enable the user's finger tips to be inserted through cut-out 26 into the recess 16 under the top surface 13 of the hand set case 12 to lift it, or to insert his thumb under the receiver to lift it when it is in the auxiliary cradle or when placing it therein. The bottom of the plate 25 is continued vertically downwardly, as at 27, to snugly fit against the back wall 11' of the base 11. The vertical portion 27 is folded forwardly underneath and against the bottom 20 of the base 11 as at 27'. The portion 27' bent against the bottom 20 is shaped to form corner brackets 60 which accommodate the pads 21 at the back edge of the bottom 20, preferably, as shown in FIG. 4, by the folded over plate portion 27' being cut into arcuate strips 28 diverging outwardly to abut the forward corners of the rear pads 21.

The strips 28 at their free or outer ends are bent upwardly against the sides 11'' of the base 11, as best shown in FIGS. 3 and 4, to form retaining clips 29 by the inturned ends 30 which snap over the upper edge of the base portion 11.

Both portion 27 of plate 25 and clips 29 are cut out, as indicated at 30 and 31, respectively, to permit passage of the cable 18 and cord 19. In some designs of case 12, the cable 18 and cord 19 are led through the rear edges of the base 11 of the case 12, and in which event, of course, such cut-outs may be unnecessary.

The hand set telephone attachment of my invention may be made of either metal sheet, or from a suitable plastic material, by being molded by the use of a sectional mold.

It will be noted that the attachment possesses a desirable degree of resiliency between the auxiliary cradle portion C' and the mounting element or plate 25 and the retaining clips 29; and that the attachment is securely retained in position on the telephone hand-set case 10 without the use of screws or other securing means additionally to the attachment itself, since the weight of the receiver-transmitter 15 holds plate 25 against the back of the case, and since no securing means are positioned in the lifting recess in the upper portion of the case, there is no likelihood of disengaging the attachment in lifting or moving the telephone receiver 15.

Placing the receiver on, and removing it from the auxiliary cradle C' is also facilitated by the provision of the cut-out 26.

The attachment of my invention is easily mounted in position by spreading the clips 29 apart sufficiently to slip over and straddle the base 11 of the case 10, the clips 29 holding the attachment against being slid off the base by the abutment of the strips 28 with the pads 21.

A preferred embodiment of the hand set telephone attachment of my invention has been specifically described and shown by way of illustration, but not as limitative of the scope of the invention, since various modifications may be made therein by those skilled in the art without departing from the scope of the invention as defined by the appended claims.

I claim:

1. An auxiliary receiver cradle attachment for a hand set telephone with a case having a bottom fitted with downwardly projecting corner pads and sides and back curved inwardly from a base portion to a receiver cradle at the top, said attachment comprising: a horizontal top portion with spaced lugs affording an auxiliary receiver cradle abutting the back of the receiver cradle of the case; a depending plate-like portion connecting at its upper end with the edge of said horizontal portion abutting the back of the receiver cradle of the case and lying against the back of the case; extensions of said plate-like portion lying against the bottom of the case and extending to the side edges thereof; and retaining extensions on said bottom extensions lying against the surface of the base portion of the case.

2. An auxiliary receiving cradle attachment as set forth in claim 1, and in which said bottom extensions are formed to engage the corner pads on the bottom of the telephone case.

3. An auxiliary receiving cradle attachment as set forth in claim 1, and in which said retaining extensions comprise inturned upper ends engaging over the upper edge of the base portion of the telephone case, said retaining extensions being sufficiently resilient to permit said inturned upper ends to be sprung over the sides of the base portion.

4. An auxiliary receiver attachment as set forth in claim 1, and in which said horizontal top portion of the attachment and an adjacent portion of the depending plate-like portion are cut out to facilitate handling of the hand set telephone with the attachment in position thereon.

5. An auxiliary receiver cradle attachment for a hand set telephone with a case having a base portion, a bottom fitted with downwardly projecting corner pads and sides and back curved inwardly from the base portion to a receiver cradle at the top, said attachment comprising: a horizontal top portion with spaced lugs affording an auxiliary receiver cradle abutting the back of the receiver cradle of the case; a depending plate-like portion connecting at is upper end with the edge of said horizontal portion abutting the back of the receiver cradle of the case and lying against the back of the case, said horizontal top portion of the attachment and an adjacent portion of the depending plate-like portion being cut out to facilitate handling of the hand set telephone with the attachment in position thereon; and bottom extensions of said plate-like portion lying against the bottom of the case and extending to embrace the sides of the case, and effective to hold the attachment on the hand set telephone.

6. An auxiliary receiver cradle attachment as set forth in claim 5, and in which said bottom extensions of said plate-like member comprise strips positioned to abut the sides of said corner pads, said strips being sufficiently resilient to be sprung over said pads in positioning the attachment on the hand set telephone.

7. An auxiliary receiver cradle attachment as set forth in claim 6, and in addition comprising: upstanding extensions of said strips extending upwardly over the outer surface of the sides of the base portion of the telephone case and engaging over the upper edge thereof, and the free ends of said extensions being inturned to embrace the upper edge of the base portion of the case.

No references cited.